United States Patent [19]

Payne

[11] Patent Number: 4,963,174
[45] Date of Patent: Oct. 16, 1990

[54] HYBRID VAPOR CYCLE/AIR CYCLE ENVIRONMENTAL CONTROL SYSTEM

[76] Inventor: George K. Payne, 28416 Quailhill Dr., Rancho Palos Verdes, Calif. 90274

[21] Appl. No.: 450,348

[22] Filed: Dec. 12, 1989

[51] Int. Cl.⁵ ............................................. F25B 9/06
[52] U.S. Cl. ..................................... 62/87; 62/172; 62/402
[58] Field of Search .................. 62/172, 401, 402, 86, 62/87, 88, 332, 333

[56] References Cited

U.S. PATENT DOCUMENTS

| | | | |
|---|---|---|---|
| 2,473,496 | 6/1949 | Mayer | 62/172 X |
| 2,622,406 | 12/1952 | Scofield et al. | 62/172 |
| 2,772,621 | 12/1956 | Arnoldi | 62/172 X |
| 2,784,571 | 3/1957 | Schelp | 62/138 |
| 2,917,288 | 12/1959 | Sims, Jr. et al. | 62/172 |
| 2,929,224 | 3/1960 | Pickard et al. | 62/172 |
| 2,947,154 | 8/1960 | Chausson | 62/402 |
| 3,097,504 | 7/1963 | Quick et al. | 62/402 |
| 3,208,234 | 3/1963 | Messinger | 62/402 |
| 3,878,692 | 4/1975 | Steves | 62/172 X |
| 4,014,179 | 3/1977 | Iles et al. | 62/88 |
| 4,263,786 | 8/1981 | Eng | 62/87 |
| 4,283,924 | 8/1981 | Schütze | 62/172 |
| 4,334,411 | 6/1982 | Payne | 62/86 |
| 4,430,867 | 2/1984 | Warner | 62/172 |
| 4,434,624 | 3/1984 | Cronin et al. | 62/172 |
| 4,487,034 | 12/1984 | Cronin et al. | 62/402 |
| 4,553,407 | 11/1985 | Rannenberg | 62/402 |
| 4,580,406 | 4/1986 | Nims | 62/87 |

Primary Examiner—Harry B. Tanner
Attorney, Agent, or Firm—David B. Abel; Robert A. Walsh

[57] ABSTRACT

A hybrid vapor cycle-air cycle environmental control system (ECS) for efficiently providing a flow of conditioned, pressurized air to an enclosed space such as an aircraft cabin.

15 Claims, 1 Drawing Sheet

HYBRID VAPOR CYCLE/AIR CYCLE ENVIRONMENTAL CONTROL SYSTEM

BACKGROUND OF THE INVENTION

The present invention relates to environmental control systems for aircraft and enclosed spaces. More particularly, the invention details a hybrid vapor cycle/air cycle environmental control system (ECS) which provides conditioned, pressurized air to an enclosed space.

Presently, the most common type of air conditioning for aircraft and enclosed spaces, which include a gas turbine engine as a primary power source, is an air cycle environmental control system. Examples of these systems are described in U.S. Pat. Nos. 4,198,830; 4,334,411; and 4,580,406. The systems of these references seek to minimize the quantity of bleed air extracted from the turbine engine while still meeting compartment heating and cooling flow requirements, and compartment pressurization and ventilation flow requirements. Typically, the flow of air required to meet heating or cooling needs is greater than that required to meet pressurization and ventilation requirements. However, if the supply air temperature to the compartment to be cooled can be reduced sufficiently, then the air flow can be correspondingly reduced to the level demanded by the requirement for ventilation and pressurization. The reduced bleed air flow extraction from the turbine engine is reflected in reduced fuel consumption or greater available power.

Heretofore, attempts to combine air cycle and vapor cycle concepts have resulted in cumbersome systems that were either just an air cycle and a vapor cycle system separately installed or were integrated systems that would not provide a continued flow of air to the compartment in the event of a failure in the vapor cycle loop.

The present invention efficiently integrates the vapor cycle loop with the air cycle components so as to minimize the total number of system components and the weight and size of the resulting system and also provides a system that is capable of continuing to deliver the critical required pressurization and ventilation air flow in the event of failure of any component within the vapor cycle loop. The complete system minimizes the extraction of bleed air from the gas turbine engine, utilizes that bleed air so as to provide the maximum contribution to the total cooling need, and provides the additional cooling needed by means of an efficient vapor cycle loop.

DETAILED DESCRIPTION OF THE PREFERRED EMBODIMENTS

Figure 1:
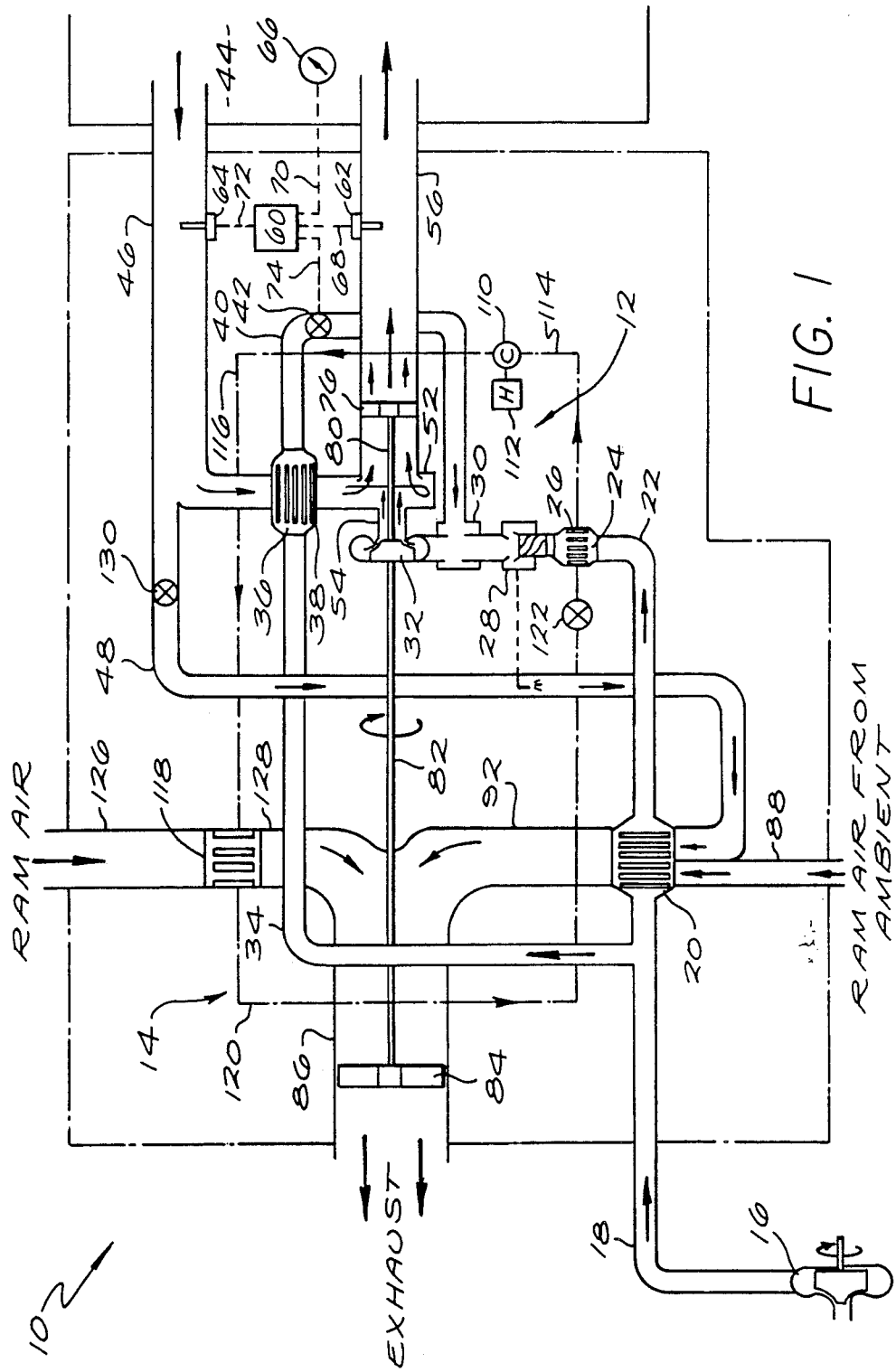
FIG. 1 schematically depicts a vapor cycle/air cycle environmental control system according to the present invention.

A hybrid vapor cycle/air cycle environmental control system (ECS) 10 is shown schematically in FIG. 1. The ECS 10 includes both an air cycle subsystem 12 and a vapor cycle subsystem 14. The air cycle subsystem 12 receives a flow of high temperature high pressure compressed ambient air from a compressor means 16. The compressor means 16 is preferably a motor driven compressor. Alternatively, the compressor means 16 may be the compressor section of a turbine engine. The high pressure air from the compressor means 16 is routed via duct 18 to the hot pass side of a heat exchanger 20, wherein the high pressure high temperature air is cooled to a lower temperature by a flow of ambient air in one portion of the heat exchanger 20 and then further cooled by a flow of exhaust air from the load being cooled in another portion of the heat exchanger 20. The cooled high pressure air exiting the heat exchanger 20 is conducted within duct 22 to the hot pass side 24 of an evaporator 26. Evaporator 26 is interactive with a refrigerant gas flowing within the vapor cycle system 14. The high pressure air is further cooled within evaporator 26 and is subsequently routed to a water separator 28 wherein condensed entrained water vapor is removed from the air flow. Downstream of water separator 28 the high pressure air enters a mixing muff 30 and is then routed to the inlet of a turbine 32.

A bypass duct 34 diverts a portion of the high pressure high temperature air from duct 18 around the heat exchanger 20 and evaporator 26 to the mixing muff 30. Within mixing muff 30, the bypass air from bypass duct 34 is mixed with the cooled air downstream of the water extractor 28 for the purpose of modulating the output of the system to control the temperature of the load being cooled or heated. Under most conditions this action is such that any remaining moisture contained within the high pressure air flow is evaporated. Air diverted within bypass duct 34 may be directed through the hot pass side of a heat exchanger 38 and subsequently through a duct 40 which includes a flow control valve 42, prior to reaching the mixing muff 30. It is the purpose of heat exchanger 38 to reduce the temperature of the air entering turbine 32. In practice the heat exchanger would be sized so that as the bypass valve 42 is opened the turbine inlet temperature rises but only to a level that can be tolerated by conventional turbine structures.

In turbine 32, the high pressure air is expanded to a lower pressure and is significantly reduced in temperature. Subsequent to turbine 32, the now conditioned cooled air is routed through a mixing plenum 52, then delivered to a cabin or enclosed space 44. A recirculation duct 46 returns a flow of recirculation air from the cabin 44 to the air cycle subsystem 12. The recirculation air is routed through the cold pass side of heat exchanger 38 and subsequently is conducted to the mixing plenum 52 which is located immediately downstream of turbine 32. The expanded cooled air from turbine 32 and the recirculated cabin air from heat exchanger 38 are mixed together in mixing plenum 52. The mixed air flow is then conducted within a fresh air duct 56 to the enclosed space 44.

A control unit 60 is connected to a first temperature sensor 62 located within fresh air duct 56, a second temperature sensor 64 located within recirculation duct 46, and a temperature selector 66 located within the enclosed space 44, by electrical wires 68, 70, 72 respectively. Control unit 60 senses the temperature of the air being delivered to the enclosed space 44 through fresh air duct 56 as well as the temperature of the air within recirculation duct 46 and controls the operation of valve 42 within the bypass duct 40 to thereby control the amount of air flowing within bypass ducts 36 and 40, and subsequently the temperature of the air delivered to the enclosed space 44.

The air expanding through turbine 32 imparts useful work thereto, which is used to drive a circulation fan 76 via a shaft 80 as well as an exhaust fan 84 via shaft 82. The recirculation fan 76 is located within the fresh air duct 56 downstream of the mixing plenum 52, and acts to induce the flow of air from the cabin 44 through the recirculation duct 46.

Within the air cycle sub-system 12 the high pressure air from compressor means 16 is cooled within the heat exchanger 20 in heat exchange relationship with a flow of ram air or ambient air which is directed to the cold pass side of heat exchanger 20 through a ram air duct 88. In addition, the heat exchanger 20 may also include a second cold pass side which receives air diverted from the recirculation duct 46 via a duct 90 which directs a portion of the cabin exhaust air to the heat exchanger 20. The warmed air exiting the two cold pass sides of the heat exchanger 20 are mixed within exhaust duct 92 which subsequently also encloses the exhaust fan 84.

The vapor cycle system 14, in addition to including the cold pass side of evaporator 26, also includes a compressor 110 preferably driven by a motor 112. The compressor 110 receives refrigerant gas from the evaporator 26 via a duct 114. The refrigerant gas compressed within compressor 110 is then routed via duct 116 to the hot pass side of a condensor 118. Within the condenser 118 the refrigerant gas condenses to a liquid and is then conducted within conduit 120 to an expansion valve 122 which is preferably immediately upstream of the evaporator 26. In the condenser 118 the refrigerant is cooled in heat exchange relationship with a flow of ram or ambient air provided via a duct 126. After cooling the refrigerant gas to a liquid, the ram or ambient air is subsequently routed with an exhaust duct 128 to the exhaust duct 92 downstream of the heat exchanger 20.

In operating the ECS 10, all or a portion of the high pressure high temperature air from the compressor means 16 is directed through the heat exchanger 20 wherein it is first cooled in heat exchange relationship with ambient air and subsequently further cooled in heat exchange relationship with cabin exhaust air. The now cooled high pressure air is subsequently routed to the evaporator 26 wherein it is further cooled in heat exchange relationship with the expanded refrigerant gases within the vapor cycle system 14. Cooling within the evaporator 26 causes condensation of entrained water vapor from the high pressure air flow, which is removed within the water separator 28.

The water removed from the airstream by water extractor 28 is carried to a water spray nozzle 94 where the difference in pressure between the water extractor 28 and the duct 48 causes the water to be sprayed in a fine mist into the airstream flowing in duct 48. Therein, the water evaporates causing a reduction of air temperature available to the cold pass side of the second section of heat exchanger 20.

The cooled and dry or demoisturized high pressure air from the water extractor 28 is subsequently mixed with the diverted high pressure high temperature air within the mixing muff 30. This mixing of the two air flows increases the temperature of the air being directed upon the turbine 32. Thus, when the air is expanded and super cooled in passing through turbine 32, entrained moisture is less likely to freeze and form discrete ice particles which could interfere with proper operation of the turbine 32. Under most operating conditions, the air exiting the turbine 32 will be at a temperature below thirty-two degrees Fahrenheit (32° F. 0° C.). Thus, in order to provide a flow of air at a comfortable temperature to the compartment 44, the recirculation air provided via the recirculation duct 46 is mixed with the super cooled air downstream of turbine 32, thereby raising the temperature to approximately forty degrees Fahrenheit (40° F., 4° C.) for delivery to the enclosure 44.

The expansion of the high pressure air through the turbine 32 drives turbine 32 and imparts useful work thereto. This useful work is then used to power the recirculation fan 76 and in addition or in the alternative the exhaust fan 84. Incorporation of the recirculation fan 76 within the fresh air duct 56 tends to draw a portion of the recirculation air through the heat exchanger 38 and into the mixing plenum 52 where it is mixed with the super cooled air from the turbine 32. In addition, the exhaust fan 84 provides a flow of ambient or ram air through both heat exchanger 20 and the cold pass side of condenser 118 of the vapor cycle system 14.

In operation, the maximum cooling load requirements for the ECS 10 occur on a hot day with high humidity. The heat exchanger 20 and evaporator 26 as well as the turbine 32 are all sized to provide maximum cooling for these circumstances with no air bypassed within the bypass duct 36. However, for off design point temperature and/or humidity conditions, the high pressure air flowing through recirculation duct 36 reduces the amount of cooling provided to the enclosure 44. Additionally, incorporation of the vapor cycle system to further augment the cooling of the high pressure air within the air cycle system efficiently reduces the amount of high temperature high pressure air required, thereby also increasing the efficiency of the environmental control system 10.

By controlling the amount of air which is bypassed around the heat exchanger 20 and evaporator 26, i.e. the primary flow path of the air cycle system 12, the amount of cooling of the pressurized air can be adapted for various environmental circumstances and cooling load requirements. The amount of air flowing through the bypass duct 34 modulates the cooling load capacity of the air cycle subsystem 12 down from the maximum design point cooling load requirements for a hot day, high humidity circumstance, thereby efficiently controlling the operation of the ECS 10.

Modulating valve 130 may be used to control the flow of air from compartment 44 to the second section of heat exchanger 20 in the event that it is necessary or desirable to operate compartment 44 at a pressure above that of the ambient pressure surrounding the environmental control system as would be the case in using this invention to cool a pressurized compartment of an airplane.

It should be evident from the foregoing description that the present invention provides many advantages in the field of environmental control systems. Although a preferred embodiment is specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

I claim:

1. An environmental control system to provide a flow of pressurized, conditioned air to an enclosed space, comprising:

means for providing a flow of hot, high pressure air;

means for cooling at least a portion of said pressurized air flow in air to air heat exchange relationship;

vapor cycle means for cooling said same portion of said pressurized air flow in heat transfer relationship with a refrigerant gas within said vapor cycle means;

bypass duct means for diverting any remainder of said pressurized air flow from upstream of said means for cooling to downstream of said vapor cycle means for cooling;

expansion turbine means for expanding said pressurized air flow while extracting useful work therefrom, said expansion of said air flow reducing the temperature thereof;

fresh air duct means for distributing said expanded cooled air from said turbine means to said enclosed space;

recirculation duct means for recirculating air from said enclosed space to a location within said fresh air duct means proximate said turbine means; and controller means for controlling the amount of pressurized air diverted through said bypass duct means and the temperature of the air flow delivered to said enclosed space.

2. The environmental control system of claim 1, further comprising:

a heat exchanger having hot side air flow passageways in communication with said bypass duct means and cold side air passageways in communication with said recirculation duct means, thereby providing air to air heat transfer between the air flow within said bypass duct means and said recirculation duct means.

3. The environmental control system of claim 2, wherein said controller means further comprises:

a first temperature sensor within said fresh air duct means, said sensor monitoring the temperature of the fresh air flow therein;

a second temperature sensor within said recirculation duct means, said sensor monitoring the temperature of the recirculated air flow therein;

a third temperature sensor within said enclosed space, said sensor monitoring the temperature of the air therein;

a control unit connected to said first, second, and third temperature sensors to monitor the temperatures of said fresh air, recirculation air, and the air within said enclosed space, respectively; and valve means mounted within said bypass duct means and connected to said control unit, for controlling the flow of pressurized air through said bypass duct means in response to said control unit.

4. The environmental control system of claim 3, further comprising:

a mixing plenum surrounding and in air flow communication with said fresh air duct means, said mixing plenum flow connected to receive said recirculation air from said recirculation duct means and configured to promote mixing of said recirculation air and said expanded, cool air from said turbine means prior to delivery of said conditioned air to said enclosed space.

5. The environmental control system of claim 3, wherein said vapor cycle means further comprise:

evaporator means for heating said refrigerant in heat transfer relationship with said pressurized air, while simultaneously cooling said pressurized air;

refrigerant compressor means for pressurizing said refrigerant, said compressor means flow connected to receive refrigerant gas from said evaporator;

first refrigerant duct means for flow connecting said evaporator means to said compressor means;

refrigerant condensor means for cooling said refrigerant in heat transfer relationship with ambient air, said condensor means flow connected to receive said pressurized refrigerant from said compressor means;

second refrigerant duct means for flow connecting said compressor means to said condensor means; and conduit means for flow connecting said condensor means to said evaporator means.

6. The environmental control system of claim 5, wherein said means for cooling further comprises:

a heat exchanger having hot pass ducts flow connected to receive said portion of said high pressure high temperature air, and a first set of cold pass air ducts flow connected to receive ambient air;

an air duct flow connected to deliver ambient air to said cold pass air ducts of said heat exchanger; and a first exhaust duct flow connected to receive heated ambient air from said cold pass air ducts of said heat exchanger.

7. The environmental control system of claim 6, further comprising:

a second air duct flow connected to deliver a flow of ambient air to air passageways within said refrigerant condensor means of said vapor cycle system; and a second exhaust duct flow connected to receive heated ambient air from said refrigerant condensor means, said second exhaust duct delivering said heated ambient air to said first exhaust duct.

8. The environmental control system of claim 7, further comprising:

exhaust fan means for drawing said ambient air through said heat exchanger and said condensor, said exhaust fan means located within said first exhaust conduit downstream of said second exhaust conduit.

9. The environmental control system of claim 8, further comprising:

a shaft drivingly connecting said turbine means to said exhaust fan means.

10. The environmental control system of claim 4, further comprising:

a fan disposed within said fresh air duct means, said fan connected to and driven by said turbine means.

11. A method of providing a flow of pressurized, conditioned air to an enclosed space, comprising:

compressing ambient air to produce a flow of hot, high pressure air;

cooling at least a portion of said pressurized air flow in air to air heat exchange relationship with ambient air;

further cooling said same portion of said pressurized air flow in heat transfer relationship with a refrigerant gas within an evaporator of a vapor cycle system;

diverting any remainder of said pressurized air flow from upstream of said air to air heat exchanger to downstream of said evaporator within a bypass duct;

expanding said pressurized air flow while extracting useful work therefrom within a turbine means, said expansion of said air flow reducing the temperature thereof;

conducting said expanded cooled air from said turbine means to said enclosed space within a fresh air duct;

recirculating air from said enclosed space to a location within said fresh air duct proximate said turbine via a recirculation duct; and controlling the amount of pressurized air diverted through said bypass duct to modulate the temperature of the air flow delivered to said enclosed space.

12. The method of claim 11, further comprising:

providing air to air heat transfer between the air flow within said bypass duct and said recirculation duct within a heat exchanger having hot side air flow passageways in communication with said bypass duct and cold side air passageways in communication with said recirculation duct.

13. The method of claim 12, wherein said controlling step further comprises:

monitoring the temperature of the fresh air flow via a first temperature sensor within said fresh air duct;

monitoring the temperature of the recirculated air flow via a second temperature sensor within said recirculation duct;

monitoring the temperature of the air within said enclosed space via a third temperature sensor within said enclosed space;

connecting said first, second, and third temperature sensors to a controller to monitor the temperatures of said fresh air, recirculation air, and the air within said enclosed space, respectively; and controlling the flow of pressurized air through said bypass duct with a valve mounted within said bypass duct in response to said control unit.

14. The method of claim 13, further comprising:

heating said refrigerant in heat transfer relationship with said pressurized air in said evaporator while simultaneously cooling said pressurized air;

pressurizing said refrigerant within a refrigerant compressor, said compressor flow connected to receive refrigerant gas from said evaporator;

cooling said refrigerant in heat transfer relationship with ambient air within a refrigerant condensor, said condensor flow connected to receive said pressurized refrigerant from said compressor; and conducting said refrigerant from said condensor to said evaporator.

15. An environmental control system to provide a flow of pressurized, conditioned air to an enclosed space, comprising:

means for providing a flow of hot, high pressure air;

means for cooling at least a portion of said pressurized air flow in air to air heat exchange relationship;

vapor cycle means including an evaporator for cooling said same portion of said pressurized air flow in heat transfer relationship with a refrigerant gas within said vapor cycle means and for heating said refrigerant;

bypass duct means for diverting any remainder of said pressurized air flow from upstream of said means for cooling to downstream of said evaporator;

expansion turbine means for expanding said pressurized air flow while extracting useful work therefrom, said expansion of said air flow reducing the temperature thereof;

fresh air duct means for distributing said expanded cooled air from said turbine means to said enclosed space;

recirculation duct means for recirculating air from said enclosed space to a location within said fresh air duct means proximate said turbine means; and controller means for controlling the amount of pressurized air diverted through said bypass duct means and the temperature of the air flow delivered to said enclosed space refrigerant compressor means for pressurizing said refrigerant within said vapor cycle means, said compressor means flow connected to receive refrigerant gas from said evaporator;

first refrigerant duct means for flow connecting said evaporator to said compressor means;

refrigerant condensor means for cooling said refrigerant in heat transfer relationship with ambient air, said condensor means flow connected to receive said pressurized refrigerant from said compressor means;

second refrigerant duct means for flow connecting said compressor means to said condensor means; and conduit means for flow connecting said condensor means to said evaporator.

* * * * *